United States Patent [19]

Nelson, Jr.

[11] Patent Number: 4,910,873

[45] Date of Patent: Mar. 27, 1990

[54] IMAGE PROJECTOR FOR PHOTOGRAPHS AND OTHER OBJECTS

[76] Inventor: J. A. Nelson, Jr., 1371 SE. 23rd Ave., Gainesville, Fla. 32601

[21] Appl. No.: 255,506

[22] Filed: Oct. 11, 1988

[51] Int. Cl.⁴ .............................................. G03B 21/06
[52] U.S. Cl. ......................................... 353/61; 353/66
[58] Field of Search ....................... 353/65, 66, 67, 57, 353/58, 59, 60, 61

[56] References Cited

U.S. PATENT DOCUMENTS

| | | | |
|---|---|---|---|
| 1,807,614 | 6/1931 | Bauersfeld et al. | 353/66 X |
| 2,047,002 | 7/1936 | Cantwell | 353/66 |
| 2,818,771 | 1/1958 | Armbruster | 353/61 |
| 4,721,380 | 1/1988 | Gryglas | 353/66 |

FOREIGN PATENT DOCUMENTS

| | | | |
|---|---|---|---|
| 2723228 | 12/1978 | Fed. Rep. of Germany | 353/66 |
| 243893 | 12/1925 | United Kingdom | 353/66 |

*Primary Examiner*—Harry N. Haroian
*Attorney, Agent, or Firm*—Edward M. Livingston

[57] ABSTRACT

An image projector is provided with increased light magnification through lenses positioned between the light source and the platen section of the projector. In addition to increased light magnification, increased image magnification is provided between the platen section and the mirror. Cooling air is directed separately over the light source and exhausted separately to dissipate additional heat generated with the increased magnification of light upstream and downstream from the platen section. The increased magnification and cooling air allows the clear projection of delicate items, such as photographs, which are otherwise not projectable by prior projectors.

16 Claims, 2 Drawing Sheets

IMAGE PROJECTOR FOR PHOTOGRAPHS AND OTHER OBJECTS

BACKGROUND OF THE INVENTION

This invention relates to opaque projectors of images upon a suitable screen from photographs, post cards, pages and three-dimensional objects.

More particularly, it relates to a method of projecting images and their color clearly by the use of greater light intensity and increased lens effectiveness in conjunction with increased cooling effectiveness.

Early image projectors such as described in U.S. Pat. Nos. 1,424,847, 1,848,378 and 2,047,002 were void of cooling methods. Objects being projected tended to distort with heat or to ignite if held under projector light long enough for the purpose intended in most cases. Later projectors provided methods of dissipating heat such as described in U.S. Pat. Nos. 2,661,655, 3,117,489 and 3,224,321. Still other patents provided improved methods for holding opaque objects, such as described in U.S. Pat. Nos. 2,449,112 and 2,578,106.

None of the prior art in previous patents or in known use provide sufficient cooling to allow for high intensity and duration of light in combination with high magnification of light and images being projected. A method of cooling described in U.S. Patent No. 2,661,655 provided for cooling through porous or foraminous platen devices. But it did not allow for flexibility of holding devices. A cooling-air circulation method described in U.S. Pat. No. 3,117,489 provided for circulating air first over the light source and then over the platten and the objects thereon with an effect of heating further the objects being projected. U.S. Pat. No. 3,224,321 provided for suction of heated air from the projector, rather than forcing entry of air for cooling.

Also, heretofore, in order to project scenes from photographs onto a wall, it was necessary to have slides made so they could be placed in a projector for projection onto a screen. Direct projection from photographs was infeasible.

Thus, there is a need for an image projector that provides sufficient heat elimination to enable photographs and other delicate objects to be placed in magnified light so that a clear image of same can be projected onto a wall or screen.

SUMMARY OF THE INVENTION

One major object of this invention is to provide image projections of clear and precise color from photographs or other objects.

Another object of this invention is to provide sufficient cooling of the photographs and other objects being projected that they are not harmed or destroyed in the process.

A further object of this invention is to provide sufficient cooling of the projector so that it can be used extensively without generating so much heat that it is offensive or dangerous.

Even another object of this invention is to provide sufficient magnification and light intensity that small objects, pictures and writing can be projected with conveniently small projectors.

The instant invention accomplishes the above and other objects by providing a projector that directs cooling air separately over the light source and the platen section of a projector. Air heated from cooling the light source may be exhausted, rather than being directed onto the platen section. Cool air is directed over the platen section in a downward flow patter that tends to hold objects to the platen. In addition to the latter novel cooling feature, a second novel feature of light magnification is provided with magnifying lenses between the light source and the platen section in addition to reflectors behind the light source. Image magnification and focusing is provided between the platen and a slanted mirror. Further image magnification and focusing could be provided optionally after being reflected onto the mirror, although the additional lens necessary for same may decrease the clarity of the image and thus the use of the lens after the mirror is not preferred.

BRIEF DESCRIPTION

This invention is described in the following description of preferred embodiments and the claims in relation to the following drawings wherein:

DESCRIPTION OF THE PREFERRED EMBODIMENT

Figure 1:
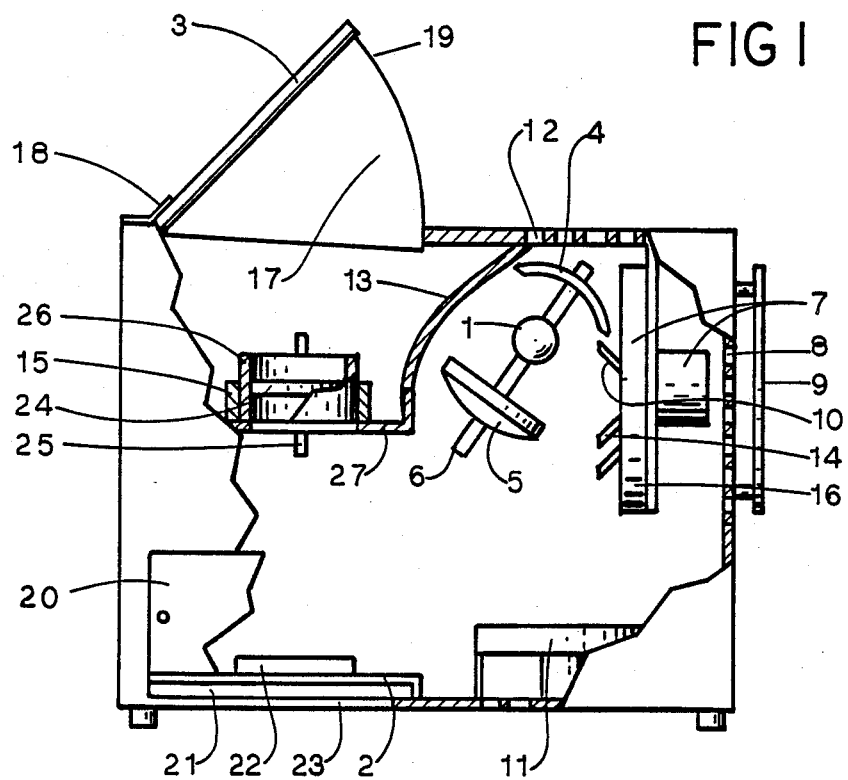
FIG. 1 is a cutaway side view of a form of the invention without image magnification and focusing after projection onto a mirror.

Referring to FIG. 1, light from a light bulb 1, sometimes herein referred to as a light source, is directed onto a platen 2, also referred to as a holder means, where it is reflected onto mirror 3. Light from the light bulb 1 is enhanced by reflector 4 and further magnified by light-magnifying lens 5.

The light-magnifying lens 5 can be adjustable in telescopic effect by linear adjustment in light-adjustment channel 6. The magnifying lens 5 can be either oval or round, depending on the shape of the light bulb I as may be determined by the shape of platen and object holder 2.

A front cooling fan and motor assembly 7 is caused to draw cooling air in through intake port 8 which has a cover 9 suspended thereover or is optionally louvered or otherwise foraminous. Intake air from the fan 7 is directed separately by light-source cooling-air deflectors, such as deflector 10, over to the light bulb 1, the reflector 4 and the light-magnifying lens 5 to exchange heat. Intake air flows directly from the fan 7 to the light-magnifying lens 5.

Air heated from cooling the bulb 1, the reflector 4 and the light-magnifying lens 5 is directed upwardly by bottom fan 11 and discharged through exhaust port 12 which is optionally louvered or otherwise foraminous. Air deflector 13 further directs cooling air downward and backward over the platen 2.

A select portion of the intake air is directed by cooling deflectors 14 towards platen 2. A portion of the intake air is directed also towards magnifying and focusing member 15.

The fan 7 can be provided with a shroud 16 to aid efficiency of directing cooling air to the separate sections of the projector.

The portion of cooling air directed at the platen 2 and the magnifying and focusing member 15 is exhausted through mirror orifice 17.

It is paramount to this invention that a high rate of airflow be provided for cooling as a result of the high level of light magnification and image magnification prior to reflection onto the mirror 3. Thus, two fans are provided, front fan 7 and bottom fan 11 to keep the intense heat from destroying a photograph or other object on tee platen 2. Alternatively, one large front fan 7 probably could be used instead of two fans as shown.

In the particular mode of the invention illustrated in FIG. 1, the mirror 3 is provided with mirror hinges 18 which allow it to be lowered when not being used. This allows small and lowcost construction. When this form is used, mirror guides 19 at each side of the projector can be utilized to minimize light deflection that might otherwise be distraction to viewers. All light is directed towards a screen or wall on which images are being projected. Closing the mirror orifice 17 when the projector is no in use also helps keep foreign objects out of the projector.

In the section of the platen 2, there can be side doors 20 at either or both sides of the projector through which objects can be inserted for projection. Also, a pas-through 21 is provided so that photographs or other objects can be placed on the platen 2 under a frame 22 and pushed out the other side of the projector through another slot without having to open the door 20. The platen 2 can be removed through the side doors 20 for displaying objects directly through an optional display orifice 23 from a surface onto which the projector may be placed. Three-dimensional objects also could be viewed in this manner by placing the projector over them and allowing them to protrude through the display orifice 23.

The magnifying and focusing member 15 is provided with focusing lens 24 and such others as desired. These lenses can be adjusted vertically by means of an adjustment bolt or other means in vertical image focusing slot 25 or by rotating a lens holder 26 when threaded into a shelf 27. Multiple lenses also can be provided and arranged optionally in convergent-divergent, divergent-convergent or other image-magnifying relationship.

Figure 2:
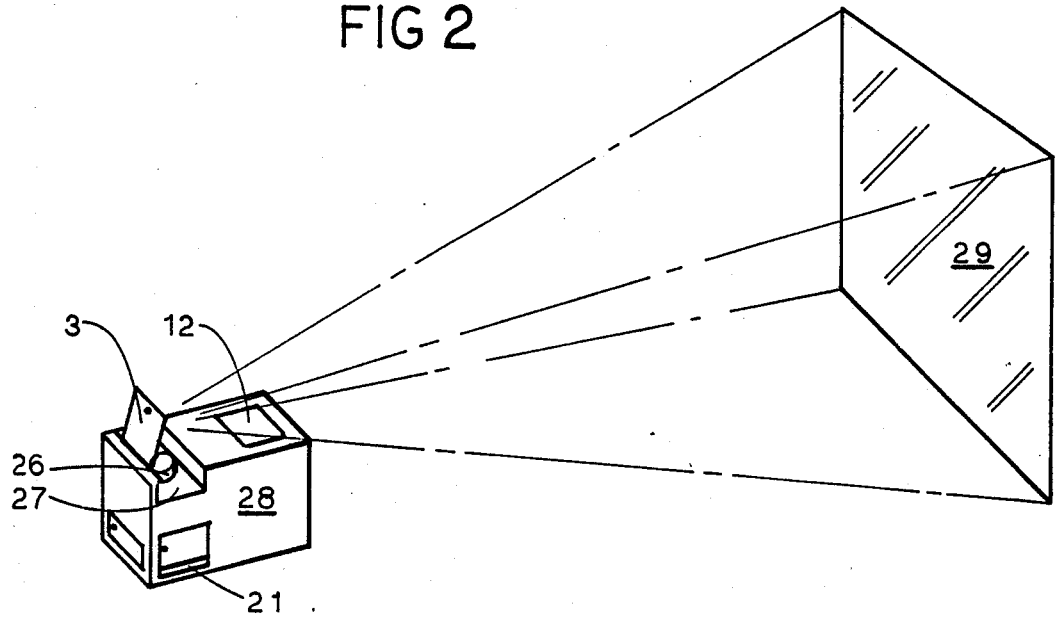
FIG. 2 is an isometric view of the invention being used to project an image, onto a screen.

Referring to FIG. 2, the projector 28 is shown being used to project an image 29 from a photograph inserted into passthrough slot 21.

Figure 3:
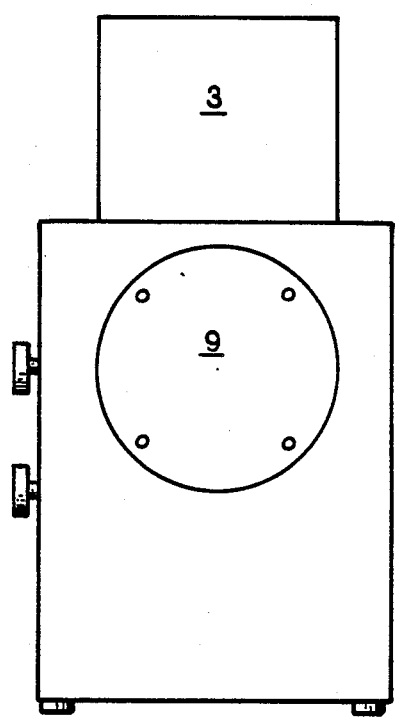
FIG. 3 is a front view of the invention.

Referring to FIG. 3, a front view of an embodiment of the invention with a stationary mirror 3 provides a front illustration also showing the front fan cover 9.

It is anticipated that a variety of forms of this invention can be constructed within the intent and foreseeable scope and modifications of this invention. All such forms and modifications are included within this invention as described in the following claims.

I claim:

1. An image projector comprising:
   a projector housing having bottom, side, front, rear and top walls;
   a means of positioning objects to be projected at a bottom rear portion of the projector housing;
   a light source mounted in a top front portion of the projector housing;
   a light reflector positioned between the light source and the front and top walls in a manner to collect light emitted toward the vicinity of the front and top walls and to direct it towards the means for positioning objects to be projected at the bottom rear portion of the projector housing;
   a magnifying lens means positioned selectively between the light source and the means for positioning objects to be projected;
   a focusing-and-image-enhancing lens means positioned selectively above the means for positioning objects to be projected;
   a pivotal mirror attached in selectively slanting relationship to the rear wall of a mirror orifice above the focusing and image-enhancing lens means;
   an air-inlet port in the front portion of the housing;
   an electrical fan positioned to draw cooling air in through the air-inlet port;
   a light-source cooling-air deflector positioned to direct cooling air from the fan in heat-exchange relationship to the light source, the reflector between the light source and the front and top walls of the projector and to light-magnifying lenses between the light source and the means for positioning objects to be projected;
   a light-source exhaust-air outlet port in a portion of the top of the housing in the vicinity of the light source;
   a light-inhibiting and air-deflecting wall positioned between the magnifying lens and the focusing-and-image-enhancing lens means and suspended downwardly from the top of the housing to a position above direct light lines from the light source and magnifying lens to the means for positioning objects to be projected; and
   platen position cooling-air deflectors positioned to direct cooling air from the fan in heat-exchange relationship to the means for positioning objects to be projected and objects positioned thereat, separately from light-source cooling air.

2. An image projector in accordance with claim 1 wherein the magnifying lens means positioned selective between the light source and the means for positioning objects to be projected is comprised of multiple magnifying lenses positioned selectively with respect to convergence and divergence of light and with respect to distance between them and distance from the light source.

3. An image projector in accordance with claim 1 and further comprising:
   a second electrical fan positioned at the bottom front of the projector to blow air over the light source.

4. An image projector in accordance wit claim 1 and further comprising:
   a platen-section back door in the rear wall of the projector through which objects can be inserted in the path of the light source and beneath the focusing-and-image-enhancing lens means.

5. An image projector in accordance with claim 1 and further comprising:
   a bottom orifice through which objects can be placed in the path of the light source and beneath the focusing-and-image-enhancing lens means from a position under the image projector.

6. An image projector in accordance with claim 1 and further comprising:
   a platen-section side door in each of the side walls in the vicinity of the object-positioning means for inserting platen devices, photo plates, books, albums, continuous belts and other containers of objects to be projected.

7. An image projector in accordance with claim 1 and further comprising:
   a platen-section back door through which objects can be inserted in the path of the light source and beneath the focusing-and-image-enhancing lens means;

a bottom orifice through which objects can be placed in the path of the light source and beneath the focusing-and-image-enhancing lens means from a position under the image projector without having to remove or dislodge them from their position;

a platen-section side door in each of the side walls in the vicinity of the platen section for inserting platen devices, photo plates, books, albums, continuous belts and other containers of objects to be projected; and multiple magnifying lenses positionable selectively between the light source and the platen section with respect to convergence and divergence of light and with respect to distance between them and their distance from the light source.

8. An image projector in accordance to claim 1 wherein at least some of the inside surfaces of the housing walls are provided with light reflectors.

9. An image projector in accordance to claim 1 wherein at least some of the housing walls are provided with heat-insulative materials.

10. An image projector in accordance to claim 1 wherein the cooling-air inlet port, the exhaust-air outlet port, the platen-section doors and other openings in the housing are provided selectively with light-deflector baffles.

11. An image projector in accordance to claim 1 and further comprising:
a means for selectively positioning the primary light-magnifying lens with respect to its distance from the light source.

12. An image projector in accordance to claim 1 and further comprising:
a means for selectively positioning separate lenses in the focusing and magnifying lens means with respect to their distance from each other and from the mirror.

13. An image projector comprising:
a projector housing having bottom, side, front, rear and top walls;
a means for positioning objects to be projected at a bottom rear portion of the projector housing;
a light source mounted in a top front portion of the projector housing;
a light reflector positioned between the light source and the front and top walls in a manner to collect light emitted from the vicinity of the front and top walls and to direct it towards the means for positioning objects to be projected at the bottom rear portion of the projector housing;
a magnifying lens means positioned selectively between the light source and the means for positioning objects to be projected;
a focusing-and-image-enhancing lens means positioned selectively above the means for positioning objects to be projected;

a stationary mirror attached in selectively slanting relationship to a mirror orifice above the focusing and image-enhancing lens means;
stationary projector side walls at both sides of stationary mirror;
an air-inlet port in the front portion of the housing;
an electrical fan positioned to draw cooling air in through the air-inlet port;
a light-source cooling-air deflector positioned to direct cooling air from the fan in heat-exchange relationship to the light source, the reflector between the light source and the front and top walls of the projector and to light-magnifying lenses between the light source and the means for positioning objects to be projected;
a light-source exhaust-air outlet port in a portion of the top of the housing in the vicinity of the light source;
a light-inhibiting and air-deflecting wall positioned between the magnifying lens and the focusing-and-image-enhancing lens means and suspended downwardly from the top of the housing to a position above direct light lines from the light source and magnifying lens to the means for positioning objects to be projected; and
platen position cooling-air deflectors positioned to direct cooling air from the fan in heat-exchange relationship to the means for positioning objects to be projected and objects positioned thereat, separately from light-source cooling air.

14. An image projector in accordance with claim 13 and further comprising:
mirror exhaust ports in a portion of the top walls extending forwardly from the top of the stationary mirror.

15. An image projector in accordance with claim 14 and further comprising:
a platen-section back door through which objects can be inserted in the path of the light source and beneath the focusing-and-image-enhancing lens means;
a bottom orifice through which objects can be placed in the path of the light source and beneath the focusing-and-image-enhancing lens means from a position under the image projector without having to remove or dislodge them from their position; and
a platen-section side door in each of the side walls in the vicinity of the plate section for inserting platen devices, photo plates, books, albums, continuous belts and other containers of objects to be projected.

16. An image projector in accordance with claim 13 and further comprising:
a means for selectively positioning separate lenses in the focusing and magnifying lens means with respect to their distance from each other and from the stationary mirror.

* * * * *